US008211206B2

(12) United States Patent
Mecchi

(10) Patent No.: US 8,211,206 B2
(45) Date of Patent: Jul. 3, 2012

(54) PROCESSING METALLURGICAL SLAG

(75) Inventor: Anton Mecchi, Krugersdorp (ZA)

(73) Assignee: Anthony Raymond Waks, Isra (IL)

( * ) Notice: Subject to any disclaimer, the term of this patent is extended or adjusted under 35 U.S.C. 154(b) by 1021 days.

(21) Appl. No.: 12/066,414

(22) PCT Filed: Aug. 28, 2006

(86) PCT No.: PCT/IB2006/002335
§ 371 (c)(1),
(2), (4) Date: May 22, 2008

(87) PCT Pub. No.: WO2007/031825
PCT Pub. Date: Mar. 22, 2007

(65) Prior Publication Data
US 2008/0250899 A1    Oct. 16, 2008

(30) Foreign Application Priority Data
Sep. 12, 2005    (ZA) .................................. 2005/07325

(51) Int. Cl.
C04B 5/00    (2006.01)
C22B 7/04    (2006.01)
C22B 47/00    (2006.01)
(52) U.S. Cl. ........................................... 75/560; 75/582
(58) Field of Classification Search .................. 75/10.35, 75/560, 582
See application file for complete search history.

(56) References Cited

U.S. PATENT DOCUMENTS
3,091,524 A    5/1963    Johnson
4,260,414 A    4/1981    Suzuki et al.

FOREIGN PATENT DOCUMENTS
| GB | 679397 | 9/1952 |
| GB | 1267365 | 3/1972 |
| GB | 1412486 | 11/1975 |
| JP | 2006161079 | 6/2006 |
| JP | 2006206957 | 8/2006 |
| RU | 2230806 | 6/2004 |

OTHER PUBLICATIONS

International Search Report, PCT/IB2006/002335, dated Mar. 29, 2007, 5 pages.
Written Opinion of the International Searching Authority in International Application PCT/IB2006/002335, dated Mar. 29, 2007, 6 pages.

Primary Examiner — George Wyszomierski
Assistant Examiner — Mark L Shevin
(74) Attorney, Agent, or Firm — Senniger Powers LLP

(57) ABSTRACT

The invention provides a method of processing a starting material in the form of a metal oxide-containing raw metallurgical slag to obtain a processed slag product. The method includes admixing the raw slag with a reductant to obtain a reaction mixture and heating the reaction mixture to cause the reductant to reduce the metal oxide in the slag, to obtain molten metal, in particular containing ferromanganese, and molten processed slag, in particular having a manganese content of at most 10% by mass. The method further includes separating the molten processed slag from the molten metal and causing or allowing the molten processed slag to solidify, thereby to obtain a solid processed slag product. This processed slag product may be, as desired, a filler for use in brick-making or for use in formulating a ready-mix concrete, an extender for extending a cement or for producing a blended cement, or an aggregate for use in the construction or building industry.

29 Claims, 1 Drawing Sheet

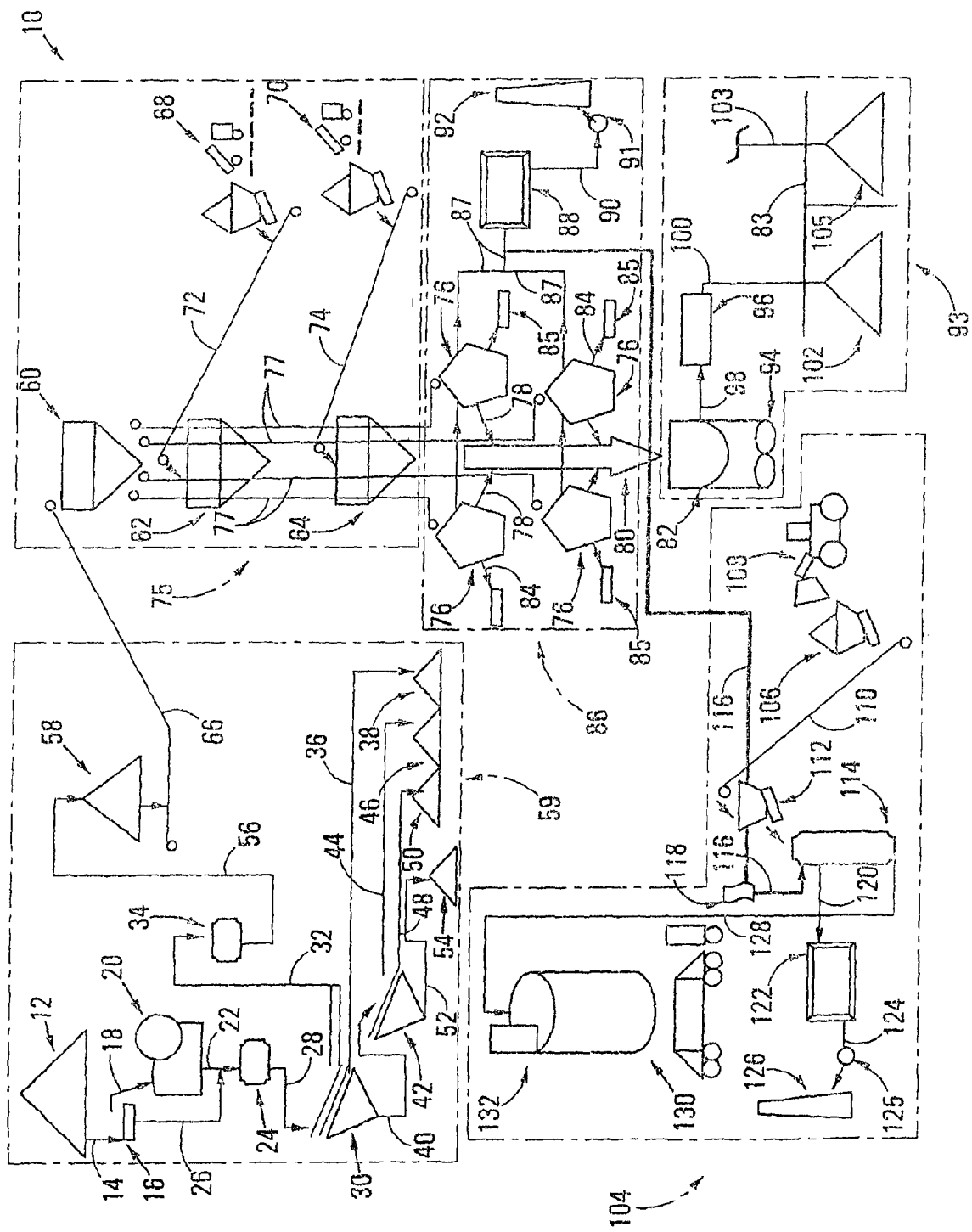

PROCESSING METALLURGICAL SLAG

CROSS-REFERENCE TO RELATED APPLICATIONS

This application is a United States National Stage Application based on International Patent Application No. PCT/IB2006/002335, filed Aug. 28, 2006, and claims the benefit of South Africa Patent Application No. 2005/06325, filed Sep. 12, 2005, the entire contents of which are incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

This invention relates, broadly, to the processing of a metallurgical slag. More particularly, the invention relates to a method of processing a waste raw metallurgical slag having a heavy metal content which is environmentally undesirable, and to dispose of the raw slag while producing at least one valuable product.

2. Description of Related Art

Not applicable.

BRIEF SUMMARY OF THE INVENTION

According to the invention there is provided a method of processing a starting material in the form of waste raw metallurgical slag having a heavy metal content which is undesirable, and to dispose of the raw slag while producing at least one valuable product, the method being characterised in that it includes the steps of:
  admixing the raw slag with a reductant to obtain a reaction mixture;
  heating the reaction mixture to cause the reductant to reduce one or more heavy metal compounds in the raw slag, to obtain molten metal and molten processed slag;
  separating the molten metal from the molten processed slag; and
  causing or allowing the processed slag to solidify.

The heavy metal content of the raw slag may be environmentally undesirable, or may be undesirable for the uses for which the processed slag is intended.

BRIEF DESCRIPTION OF THE SEVERAL VIEWS OF THE DRAWINGS

Not applicable.

DETAILED DESCRIPTION OF THE INVENTION

The heavy metal compounds will typically include compounds selected from the group consisting of heavy metal oxides, heavy metal silicates, and mixtures thereof, although, naturally, other heavy metal compounds, capable of reduction, will usually be present in the raw slag, and will be reduced by the reductant. Naturally, heavy metals can also be present in the raw slag in a native, metallic form, and these will simply be melted by the heating and separated, together with the reduced metal, from the processed slag.

Both the raw slag and the reductant which are admixed to obtain the reaction mixture may be in solid form when they are admixed. Instead, at least part of the raw slag which is admixed with the reductant to obtain the reaction mixture may be in molten form, the reductant being in solid form. Accordingly, when the raw slag is available in the form of a stockpile such as a tip or dump located near a metallurgical furnace which produces the raw slag in molten form, using some raw slag in solid form from the stockpile together with some raw slag from the metallurgical furnace in molten form can lead to substantial power saving in the heating step of up to 35% or more, the slag when molten usually being at a temperature of 1100-1650° C., e.g. 1200-1550° C.

The method may include the step of comminuting at least one of the raw slag and the reductant in solid form to achieve size reduction thereof before the admixing. More particularly, the raw slag may be comminuted to achieve size reduction thereof, the comminuted raw slag then, before the admixing, being subjected to size classification to obtain a desired particle size fraction thereof which is admixed with the reductant to obtain the reaction mixture. This size fraction may comprise particles having a particle size of at most 70 mm, obtained by crushing at ambient temperature.

The heating of the reaction mixture may be by means of a furnace, the method including the step of discharging the molten metal and the molten slag from the furnace at a temperature in the range 1300-1650° C. More particularly, the discharging of the molten metal and the molten slag from the furnace may be at a temperature in the range 1350-1550° C. While the heating may in principle be by means of an induction furnace, and while it may be carried out more or less continuously, the furnace is preferably an arc furnace which is operated batchwise.

Whether the heating is carried out more or less continuously or more or less batchwise, separating the molten metal from the molten processed slag will typically be by way of a gravity separation, the molten processed slag floating as a layer on the molten metal. Thus, for example, this separation may take place in the furnace itself, or in another vessel, such as tilting crucible, which may have a tapping opening at a low level. The molten metal can be tapped from the vessel at a low level and the slag can be poured or decanted, e.g. as an overflow from the vessel at a high level, by tilting the vessel. Instead, the slag can be decanted first, followed by decanting of the metal by tilting the vessel. This feature, i.e. the separation of the processed slag and metal, both in molten form, from each other, thus has the major advantage that, not only can processed slag be obtained in relatively metal-free form, uncontaminated by the metal, but the metal can also be obtained in relatively slag-free form, uncontaminated by the slag. Thus both the processed slag and metal can be in relatively pure form for the intended downstream uses thereof. The gravity separation made possible by this feature of the method of the present invention furthermore lends itself to a variety of different separation methods (tapping, decanting, pouring by way of tilting a vessel, etc.) adding to the versatility of the method of the invention. Furthermore, use of electrically-powered furnaces such as induction furnaces or arc furnaces facilitates keeping the slag and metal at a temperature at which they are molten at all times, after the reduction has taken place, and until they are separated. It is to be emphasised that, regardless of the reaction temperatures employed, the heating should act at all times to keep the slag and metal molten, at least until they have been separated.

The method may include the step of allowing the molten processed slag to solidify by subjecting it to air-cooling by natural convection, typically at a relatively slow rate by tipping it on to a stockpile such as a tip or dump in the open, and leaving it to cool for a sufficient time, the solidified processed slag then being subjected to comminution to achieve size reduction thereof which renders it in the form of an aggregate, the aggregate being a said valuable product.

Instead, the method may include the step of causing the molten processed slag to solidify by contacting it with liquid water to cause granulation of the processed slag to obtain a granulated processed slag product, the granulated processed slag being a said valuable product.

While the processed air-cooled slag product in aggregate form will usually be regarded as a final product for sale on to users thereof in the construction or building industry, the granulated processed slag product can be regarded as an intermediate product which can be stockpiled for further processing later, or can be sold on, for use as an extender or filler, to manufacturers of, for example, bricks, ready-mix concretes, slag-extended blended cements, or the like, after grinding or milling, if necessary, to a sufficiently small particle size. Instead, the granulated processed slag intermediate product may be processed further, as described hereunder, to produce a more or less final processed slag product.

The raw slag in question is typically obtained from metallurgical furnaces used in metal production. Such slags include not only basic oxygen furnace (BOF) slags or arc furnace (AF) slags obtained during steel production, but they importantly include also slags obtained from furnaces used in the production of other metals, which may be in the form of alloys and may be toxic, for example in the production of manganese or ferromanganese. Such slags may be brought in from metal producers located off-site, or, optionally after production may be used immediately on-site in molten form or, after solidification by air-cooling thereof by natural convection on-site, may be stockpiled. Thus, a stockpile of solid raw slag may be provided from which raw slag to be processed in accordance with the method of the present invention may be withdrawn, continuously or batchwise, as desired, for further processing. The comminution of the raw slag, prior to the admixing thereof with the reductant may, for example, be by crushing, to cause the size reduction thereof. The classification of the comminuted raw slag, prior to the admixing with the reductant may, for example, be by sieving or screening, to obtain a classified particulate raw slag having a desired particle size and/or a desired particle size distribution.

As indicated hereunder, a silicon-containing reagent, conveniently a silica-containing reagent, may be admixed with the raw slag while forming the reaction mixture, and this reagent may be solid, for example being a silica sand. The reductant may likewise be solid, being for example a silicon-containing, aluminium-containing or, in particular, a ferrosilicon-containing or a carbon-containing reductant such as coal. Carbon-containing reductants, for example coal, are much preferred by virtue of their ready availability and low cost, and in this regard they are to be contrasted with aluminium-containing or ferrosilicon-containing reductants which, for certain processed slag products, can indeed be regarded as contaminants to be avoided. These reductants and reagents may similarly be subjected to comminution and classification before the admixing thereof with the raw slag to obtain the reaction mixture, to obtain a desired particle size and/or size distribution. In such cases the reaction mixture will be a solid particulate mixture, the heating thereof, as indicated above, acting to melt the reaction mixture and to form the molten metal and the molten processed slag which is then granulated. The granulation has been found by the Applicant conveniently to be effected by a proprietary granulator such as the granulators available in South Africa from Bateman Metals Limited, Bartlett Road, Beyers Park, Boksburg, Gauteng Province, South Africa.

As indicated hereunder, the granulated processed slag may be subjected to dewatering, before it is subjected to further processing; and the granulated processed slag may be comminuted, for example by crushing and/or milling, for example by milling during or after the dewatering thereof. The comminuted dewatered processed slag may then be stockpiled before use or before onward sale to users, or may be used immediately on site for the manufacture of end products of the type mentioned above, of which it forms a constituent which acts as an extender.

The Applicant has successfully employed both crushed air-cooled raw ferromanganese and air-cooled raw BOF slags having a particle size of up to 70 mm, admixed with screened coal reductant having a particle size of up to 30 mm. When a solid silicon-containing or calcium-containing reagent such as silica sand or limestone respectively is admixed with a raw slag obtained from BOF steel production or from manganese or ferromanganese production, the silica-containing or calcium-containing reagent preferably has a particle size of at most 30 mm. Similar considerations would apply to any magnesium-containing reagent used.

While the heating of the reaction mixture preferably takes place in an arc furnace on a batchwise basis as indicated above, it can instead take place in an induction furnace, on a continuous basis. In each case the other steps of the process may however be more or less continuous or batchwise, as desired, raw slag being withdrawn continuously or batchwise from a stockpile or the like, and the crushing, screening, and the admixing being carried out on a similarly continuous or batchwise basis as desired, to make available a suitable feed to the furnace, whether an arc furnace or an induction furnace.

Various optional additives, in addition to the reductants such as the carbon-containing or ferrosilicon-containing reductants mentioned above, may be added to the reaction mixture in the furnace, including aluminium-containing, phosphorus-containing, silicon-containing and calcium-containing reagents. The furnace may be arranged to discharge, on a batchwise or continuous basis, as the case may be, molten slag at a temperature of 1300° C. -1650° C., preferably 1350° C.-1550° C. as mentioned above, and to discharge liquid metal on a batchwise or continuous basis which may be air-cooled in a sand bed, e.g. prior to re-use in the metal production process from which the raw slag is obtained.

A plurality of induction furnaces, operated in parallel, each with its own supply of reaction mixture, may be used to heat the reaction mixture, to produce the molten metal and molten processed slag. Instead, a single arc furnace may be used, having two or more mobile tipping crucibles or shells which are movable to and away from a charging station, a melting station provided with a common set or column of electrodes and one or more tipping stations.

Off-gases from the furnaces may be used to dry the coal feed during crushing or milling thereof, and to dry the dewatered slag, for example during crushing or milling of said coal and dewatered slag.

The granulation of the processed slag will involve vitrification of the slag and may be such as to obtain a particle size of at most 10 mm, having a glass content making up at least 50% thereof by mass, typically at least 67%, preferably at least 80%, and up to 90% or more.

After dewatering the processed slag it may be dried to a water content of at most 1% by mass, typically 0.5-1% by mass. The dewatered granulated processed slag may then be milled, and after milling, preferably has a particle size of at most 105 μm, typically with a surface/mass blaine or specific surface in the range 3500-4500 cm$^2$/g.

The invention extends to a processed slag whenever made by means of the method of the present invention as defined and described above. The invention also extends to an extended cement or concrete product, or to an extended brick product, containing and extended by said granulated processed slag.

When used as an extender for ordinary Portland cement, the milled processed slag may be admixed with ordinary Portland cement to obtain a slag:cement mass ratio of 6:94-95:5, typically 15:85-65:35 and preferably 30:70-50:50.

When used for brick-making, granulated processed slag will typically form at most 45% by mass of the brick product, typically 15-45%, and, when used, milled processed slag will typically form 2-15% by mass of the brick product.

The granulation may result in sufficiently quick cooling to vitrify the slag, at least in part. Thus, the granulation of the processed slag may in particular achieve vitrification of the slag, the granulation being such as to obtain a grain- or particle size of at most 10 mm and to obtain a glass content of the granulated slag of at least 50% by mass. The method may include the step of de-watering the granulated processed slag; and the method may include the step of comminuting the granulated processed slag to achieve size reduction thereof, e.g. to render it suitable for use as a filler in brick-making or in formulating a ready-mix concrete, or as an extender for extending a cement such as an ordinary Portland cement (OPC) to produce a blended cement.

Instead of or in addition to producing processed slag as a valuable product such as an aggregate for use in the construction or building industry, or as a filler or extender for use in brick-making or concrete/cement formulation, the method of the present invention may produce a metal, which may be in the form of an alloy, as the valuable product. It is to be emphasised that it is expected that there will be situations where economic considerations dictate that both processed slag and a reduced metal or alloy be produced simultaneously as valuable products, for the method of the invention to be economically attractive or at least viable, and the present invention naturally extends to versions of the method involving such simultaneous production.

Thus, the molten metal separated from the molten slag may be a said valuable product; and the separated metal may be fed to a metallurgical furnace for further processing. This may be done with the metal in molten form, although it is expected that the metal separated from the processed slag will usually be caused or allowed to solidify, before it is fed to the metallurgical furnace for further processing.

In a particular embodiment of the invention, the raw slag may, at least in part, be selected from manganese-containing slags, iron-containing slags and mixtures thereof. Such manganese-containing slags are expected usually to be obtained from ferromanganese production. Thus, the raw slag may comprise a mixture of at least one manganese-containing slag and at least one iron-containing slag, so that the metal product comprises ferromanganese, which can profitably be returned to the ferromanganese production from which the manganese-containing raw slag is obtained. The method may include the step, while admixing the raw slag with the reductant to obtain the reaction mixture, of also admixing a silicon-containing reagent therewith, so that the reaction mixture contains silicon. The method may also include the step, while admixing the raw slag with the reductant to obtain the reaction mixture, of also admixing a calcium-containing reagent therewith, so that the reaction mixture contains calcium. The silicon-containing reagent will typically be silica, while the calcium-containing reagent may comprise lime, lime hydrate or calcium carbonate. The addition of the silicon-containing reagent or the calcium-containing reagent may be used to optimise the CaO:SiO$_2$ mass ratio in the reaction mixture, and while it is expected to be used typically with raw slag from metallurgical alloy production such as ferromanganese production, such addition of silicon-containing reagent or calcium-containing reagent can be employed with any raw slag, for example by adding the calcium-containing reagent or the silicon-containing reagent to a basic oxygen furnace (BOF) slag respectively either to raise its calcium content, expressed as CaO, or to raise its silicon content, expressed as SiO$_2$. The method may thus, for a BOF raw slag, include adding a silicon-containing reagent such as silica thereto, to reduce the CaO:SiO$_2$ mass ratio.

The composition of the reaction mixture may be selected to provide the ferromanganese product with a manganese content of 70-90% by mass, preferably 76-80%, and an iron content of 5-20% by mass, preferably 10-15%.

In particular, the iron-containing slag may be a slag obtained from a basic oxygen furnace (BOF) steel production process. The iron-containing slag may comprise 20-45% by mass, typically 25-38%, iron, expressed as Fe$_2$O$_3$. BOF slag is an inexpensive source of iron, being conveniently de-metalled and air-cooled; and the manganese-containing slag may be a slag obtained from a ferromanganese production process, for example as so-called fresh horizons, which have been de-metalled. The manganese-containing slag may comprise 15-65%, usually 15-27%, by mass manganese, expressed as MnO.

In a particular embodiment, the reaction mixture contains calcium, magnesium and silicon, the calcium, magnesium and silicon being present in proportions which, when expressed respectively as CaO, MgO and SiO$_2$, provide the reaction mixture with a basicity expressed as the mass ratio (CaO+MgO) : SiO$_2$, in the range 1.3:1-1.8:1, typically in the range 1.4:1-1.7:1. The calcium and silicon in the reaction mixture may be obtained, if necessary, by adding the calcium-containing and silicon-containing reagents, and the magnesium in the reaction mixture may similarly be obtained, if necessary, by adding a magnesium-containing reagent such as magnesium oxide or magnesium carbonate thereto.

Sufficient reductant may be employed in the reaction mixture to achieve a manganese content in the processed slag of at most 10% by mass, expressed as MnO, preferably at most 7%.

The invention extends also to a metal or alloy product, whenever made by means of the method of the present invention as defined and described above.

The invention will now be described, by way of non-limiting illustrative example, with reference to the accompanying schematic drawing, in which the single Figure is a block diagram showing a flow chart of an installation for carrying out the method of the present invention for use in processing a basic oxygen furnace (BOF) slag obtained from the production of steel.

In the drawing, reference numeral 10 generally designates an installation for carrying out the method of the present invention. The installation 10 comprises a stockpile 12 of raw BOF slag from steel production. The stockpile 12 is shown feeding along a solids flow line 14 to a grizzly feeder 16 which in turn feeds along solids flow line 18 into a jaw crusher 20. The jaw crusher 20 feeds along a solids flow line 22 into a cone crusher 24, a fines by-pass flow line 26 leading from feeder 16 into flow line 22.

The cone crusher 24 is shown feeding along a solids flow line 28 to a triple-deck screen 30 which in turn feeds from its central and uppermost decks along solids flow line 32 to a cone crusher 34. The screen 30 feeds from its lowermost deck along solids flow line 36 to a stockpile 38, and feeds material passing through its lowermost screen along solids flow line 40 to a double-deck screen 42. Screen 42 feeds from its upper deck along solids flow line 44 to a stockpile 46, and feeds from its lower deck along a solids flow line 48 to a stockpile 50, while feeding material passing through its lower screen along solids flow line 52 to a stockpile 54. Cone crusher 34 feeds along solids flow line 56 to a stockpile 58. The various parts of the installation 10 described above are grouped together in a crushing plant, generally designated 59.

The installation 10 also comprises three load-out bins, namely a raw slag load-out bin 60, a silica sand load-out bin 62 and a coal load-out bin 64. Stockpile 58 is shown feeding along solids flow line 66 to bin 60, flow line 66 comprising a conveyor belt. An ultrasonic/laser eye (not shown) controls feeders feeding from stockpile 58 to bin 60 along line 66. A silica sand tip is shown at 68; and a duff coal tip is shown at 70. Tip 68 feeds along conveyor belt solids flow line 72 to the silica sand load-out bin 62; and tip 70 feeds along conveyor belt solids flow line 74 to the coal load-out bin 64. Ultrasonic/laser eyes (also not shown) respectively control silica sand feed from tip 68 to bin 62 along line 72; and control coal feed from tip 70 along line 74 to bin 64. The bins 60, 62 and 64 and tips 68 and 70 are together grouped in a raw materials handling plant, generally designated 75.

The installation further comprises four induction furnaces 76, arranged to operate in parallel and fed along respective solids flow lines (shown schematically at 77) from the bins 60, 62 and 64. Each furnace 76 has a processed slag tap overflow 78 leading to a common molten slag launder 80 in the form of a sand bed arranged for gravity feed of molten slag to a granulator 82. Each furnace 76 in turn has a metal tap overflow 84, each overflow 84 leading to an associated sand bed 85 which permits air-cooling and recovery of metal overflow. The furnaces 76 with their overflows 78, 84 with the launder 80 and the beds 85 are grouped together in a furnace plant, generally designated 86. The plant 86 also includes hot gas tap-off lines 87 leading from the furnaces 76 to an electrostatic precipitator 88 which in turn feeds along a gas flow line 90 provided with a blower 91, to a stack 92.

The installation 10 still further comprises a granulation and dewatering plant, generally designated 93 and fed by the launder 80. The plant 94 comprises the granulator 82, and a bunker 83. The granulator 82 is of proprietary design and is obtained from Bateman Metals Limited, being arranged to granulate processed slag from launder 80 by contact of the slag with liquid water so that 100% of the granulated slag passes a 10 mm screen and has a glass content or degree of vitrification of at least 50% by mass. The granulator 82 is associated, in a closed circuit, with cooling towers 94 for condensing steam produced by the granulator 82 and for cooling water employed by the granulator 82. The circuit includes also a dewatering device 96 for dewatering slag issuing from the granulator 82 along solids feed line 98. The de-watering device 96 feeds de-watered granulated processed slag along solids flow line 100 to granulated slag stockpile 102 in the bunker 83; and device 96 is arranged to recycle water along the circuit to the granulator 82 and cooling towers 94. A branch flow line 103 branches from the launder 80, between the furnaces 76, on the one hand, and the granulator 82, on the other hand. This branch line, which is only partially shown for ease of illustration, leads to a stockpile 105 in the bunker 83, where the slag is air-cooled, before feeding thereof to the crushing plant 59, as described hereunder.

The installation 10 finally comprises a slag milling and despatching plant, generally designated 104 and having a drive-over bin 106 fed by a front-end loader 108 from the stockpile 102. The bin 106 feeds along a conveyor belt solids flow line 110 to a mill feeder 112, shown feeding into a roller mill 114. A gas flow line 116 provided with a blower 118 feeds hot furnace gases from tap off lines 87 to the mill 114. Mill 114 feeds along a gas flow line 120 to a bag filter 122, which in turn feeds along gas flow line 124 provided with a blower 125, to a stack 126. Mill 114 feeds along a solids flow line 128 to a storage silo 130 provided with a bag filter 132.

In accordance with the processing method of the present invention a raw slag containing silicates of iron, oxides of iron and/or metallic iron from a BOF process is stockpiled in the stockpile 12. The grizzly feeder 16 removes fines from the raw slag and choke feeds the jaw crusher 20 under controlled conditions, the fines passing along line 26 to line 22 and then to cone crusher 24 where further crushing takes place. The screen 30 screens crushed raw slag which it receives along line 28 from crusher 24. Material retained by the uppermost and intermediate decks of the screen 30 passes along line 32 to cone crusher 34 where it is further crushed to a particle size of at most 70 mm. Material retained by the lowermost deck of the screen 30 passes along line 36 to stockpile 38, while material passing through the lowermost deck of the screen 30 passes along flow line 40 to screen 42 where it is further screened.

Material retained on the upper deck of the screen 42 passes along flow line 44 to stockpile 46, while material retained on the lower deck of the screen 42 passes along line 48 to stockpile 50. Material passing through said lower deck of the screen 42 passes along line 52 to stockpile 54. Material in the stockpiles 38, 46, 50 and 54 forms an aggregate product in compliance with the specifications of BS EN (British Standard/European Norm) 12620:2002 with regard to aggregates for concrete, and of BS EN 13242:2002 with regard to aggregates for unbound and hydraulically bound materials for civil engineering work and road construction. Crushed raw slag from the cone crusher 34 passes along line 56 to stockpile 58.

Crushed raw slag is fed from stockpile 58 along conveyor 66 to bin 60. In turn, silica sand with a maximum particle size of 2 mm is conveyed by the conveyor 72 from the silica sand tip 68 to the bin 62, while duff coal of a particle size of at most 8 mm is conveyed by the conveyor 74 from the tip 70 to the bin 64.

Raw crushed particulate slag, silica sand and duff coal are respectively conveyed from the bins 60, 62 and 64 along flow lines 77 to the respective induction furnaces 76.

Melting takes place in the induction furnaces, wherein the coal acts as a reductant, reducing the compounds of iron in the raw slag, the heating converting the slag to a molten processed slag at a temperature of 1450-1600° C. The silica sand added amounts to 12-15% by mass of the slag and eliminates problems arising from free lime in the raw slag, there typically being a $CaO:SiO_2$ mass ratio of 0.9:1-1.4:1. A reduction of up to 90% by mass of the compounds of iron is achieved by means of the coal reductant, the processed slag containing at most 4% by mass $Fe_2O_3$ and having a metallic iron content of at most 0.5% by mass. Additional slag-conditioning additives such as aluminium, lime and phosphorus are optionally added to the slag in the furnaces 76.

The furnaces 76 are operated continuously, and discharge processed slag at a temperature of 1450-1600° C. as an overflow into the launder 80. Molten metal is discharged from the furnaces 76 as an overflow into sand beds 85 for air-cooling, before recycling thereof to the steel production process from which the raw slag was obtained.

Granulation of the molten processed slag takes place in the granulator 82, the associated cooling towers acting to conserve water and to keep it at a temperature of at most 35° C. Granulated slag passes along line 98 to the dewatering device 96 where it is dewatered, the dewatered slag passing along line 100 to the stockpile 102. Furnace gases issuing along lines 87 from the furnaces 76 pass along lines 87 to the electrostatic precipitator 88, and then along flow line 90 via the blower 91 to the stack 92 where they are similarly vented to atmosphere.

A proportion of the molten processed slag from the launder 80 bypasses the granulator 82 and passes along flow line 103 to the stockpile 105 in the bunker 83, where the bypassed slag is air-cooled for use in the crushing plant as described hereunder.

The front-end loader 108 is used to convey the processed slag from the stockpiles 102 to the drive-over bin 106 from which it is fed to the conveyor 110. It is contemplated that some of the granulated slag from the stockpiles 102 will usually be sold on to the civil-engineering and building industries for use as aggregate.

The conveyor 110 feeds the mill feeder 112 which in turn feeds the roller mill 114, where the processed slag is milled to a particle size of at most 50 microns ($\mu$m). The blower 118 blows hot furnace gases along line 116 from the furnaces 76 to the mill 114, to dry the processed slag during milling thereof in the mill 114. Furnace gases issue from the mill 114 along line 120 to the bag filter 122, and then along line 124 via blower 125 to the stack 126 where they are vented to atmosphere.

Milled processed slag issues from the mill 114 along line 128 to the storage silo 130, gases issuing from the silo 130 passing through the bag filter 132 to atmosphere.

As indicated above, air-cooled slag is fed from the stockpile 105 to the crushing plant 59. In the crushing plant 59 the feed via the feeder 16 to the crusher 20 from the stockpile 12 is alternated with feed via the feeder 16 to the crusher 20 from the stockpile 105. Feed from the stockpile 12 is crushed for use in the method of the present invention and passes via stockpile 58 to the raw materials handling plant 75; and feed from the stockpile 105 is, after crushing, stockpiled in the stockpiles 38, 46, 50 and 54 for onward sale into the aggregate market.

The Applicant has made various developments and improvements to the basic set-up illustrated in the drawing. Thus, the Applicant has found it to be beneficial if the four induction furnaces 76 are replaced by an arc furnace (not shown) having a pair of mobile tilting crucibles or shells. The shells are movable to and away from a charging station (not shown), where they are chargeable and in use are charged via the flow lines 77 from the bins 60, 62 and 64, to and away from a melting station (not shown) provided with a common set of electrodes arranged in a column and where a solid charge in the shells can be melted and in use is melted, and to and away from a tipping station (also not shown) where the shells are tippable and in use are tipped separately to discharge molten metal and molten slag therefrom. At the tipping station the shells are arranged to tip molten metal into the sand bed 85 for air-cooling of the metal and recovery of the metal in solid form. At the tipping station the shells are also arranged to tip molten slag into the granulator 82, or the stockpile 105 in the bunker 83, as the case may be, the slag tap overflows 78, the launder 80 and the metal tap overflows 84 being eliminated.

Using the arc furnace instead of the induction furnace 76 permits the stockpile 58 to be fed with a proportion of raw BOF slag directly from the stockpile 12, which slag has not passed through any of the crushers 20, 24 or 34. This allows flow line 56 to be replaced by a flow line (not shown) from stockpile 12 to the stockpile 58, the crusher 34 in turn feeding via a flow line (not shown) to the screen 30 and part of the discharge from the crusher 24 being diverted away from the screen 30 and to the stockpile 58, conveniently via a flow line leading from the discharge from the crusher and into the flow line from the stockpile 12 to the stockpile 58. In this case, the Applicant has found it to be convenient to have a lime load-out bin (not shown), provided together with the bins 60, 62 and 64 as part of the raw material handling plant 74, arranged to feed along the flow lines 77 to the arc furnace. Finally, it has been found to be advantageous to replace the precipitator 88 with a gas filter plant (not shown) comprising bag filters.

Operation of the developed and improved method is in most respects largely similar to that of the basic method illustrated by the drawing, with certain changes. Thus, instead of being fed by flow line 56 from the crusher 34, the stockpile 58 is fed directly in part from the stockpile 12 and in part from the crusher 24, the remainder of the output of the crusher 24 being fed to the screen 30, together with the output of the crusher 34. In turn, the feeds along flow lines 77 from the raw materials handling plant 75 to the furnace plant 86 include in addition to feeds from the bins 60, 62 and 74, also a lime feed from the lime bin.

Similarly to the induction furnaces 76, the arc furnace shells are charged from the bins 60, 62 and 64, and from the lime bin, at the charging station, whence the shells are moved to the melting station, where the charges therein are melted by the electrodes of the electrode column. The shells are then moved to the tipping station, where they are tipped to discharge molten slag to the granulator 82 and to discharge molten metal to the sand bed 85. Importantly, it is to be noted that, instead of being operated on a more or less continuous basis, as with the induction furnaces 76, the shells of the arc furnace are operated batchwise and alternately, so that when one of the shells is having its charge melted, the other is being tipped to discharge its molten charge and is then being charged with a succeeding charge of raw materials, and vice versa. This leads to economies arising from an increased rate of utilisation of the charging station, melting station and tipping station (compared with an arc furnace having a single shell), while use of the arc furnace permits a coarser slag feed to the furnace plant 86 from the crushing plant 59.

The Applicant has found that the milled processed slag produced by the method of the present invention as described with reference to the drawing is suitable for use a cement extender (or as a filler before milling) for use in the manufacture of bricks, ready-mixed concretes, slag-extended cements, or the like. It is a feature of the invention that it can turn raw metallurgical furnace slag, which can be regarded as an environmental embarrassment, into a useful constituent for the brick-making or cement-producing industry. Although the method of the present invention has been described with reference to the drawing for the processing of BOF furnace raw slag obtained from steel making, it can be employed in essentially similar fashion for processing raw slag from ferromanganese production as described hereunder.

Thus in a variation of the present invention which employs raw slag from ferromanganese production rather than from steel production by the BOF process, the stockpile 12 will comprise air-cooled slag from ferromanganese production, which slag has been de-metalled. The stockpile 12 is supplemented by an additional raw slag supply (not shown), comprising molten slag at 1200-1400° from ferromanganese production, the additional molten slag feeding along a flow line (not shown) directly into the arc furnace 34. The mass ratio of the air-cooled slag:molten slag is typically 40:60. Naturally, the molten slag can be omitted, but using only air-cooled slag foregoes the power saving of up to 35% or more attainable from using molten slag.

The air-cooled ferromanganese raw slag in the stockpile 12 contains 15-27%, typically about 23%, by mass MnO. Raw slag from the stockpile 12 can be fed directly into bin 60; and molten raw slag from ferromanganese production can be fed directly into the arc furnaces (not shown) which replace the induction furnaces 76. The mass ratio of solid raw slag:molten raw slag can be above 40:60, being for example 100% solid (air-cooled) slag, but can also be below 40:60, down to a solid:molten slag mass ratio as low as 10:90.

The ideal basicity or converting MnO to Mn is 1.4:1-1.8:1 and this can be controlled, if necessary, by adding an appropriate amount of lime or other calcium source to each batch, together with an appropriate amount, if necessary, of silica. For example, to 900 kg of raw ferromanganese slag having a $CaO:SiO_2$ mass ratio of 1:1 and with an MnO content of 23% by mass, 65 kg of calcium (e.g. as lime) can be added, together with 100 kg of raw BOF steel slag having a $CaO:SiO_2$ mass ratio of 2.7:1-3:1, and an $Fe_2O_3$ content of 30-35% by mass, to obtain a basicity of $(CaO+MgO):SiO_2$ by mass of about 1.5:1, and a $CaO:SiO_2$ mass ratio of about 1.2:1. The calcium can be fed from bin 62. The BOF steel raw slag is added to raise the proportion of iron in the ferromanganese product, in cost-effective fashion, to obtain a ferromanganese alloy product containing 76-80% by mass Mn and 13-16% by mass Fe. The BOF steel raw slag can be air-cooled de-metalled slag fed from bin 64.

When the processed slag separated from the ferromanganese product is intended for granulation and size reduction to produce a processed slag filler or cement extender, the $CaO:SiO_2$ mass ratio therein should, if possible, be in the range 1:1-1:1.4 by mass. After the reduction of the MnO to Mn, the $CaO:SiO_2$ mass ratio is usually above 1.4:1, however, but can be reduced by adding additional $SiO_2$ to the molten processed slag before the granulation thereof, e.g. from a suitable bin (not shown).

Carbon is the preferred reductant, and about 65 kg of carbon, e.g. as coal, can be added, together with said 100 kg of BOF steel raw slag, to each 900 kg of ferromanganese raw slag, the carbon acting to reduce the MnO content of the ferromanganese slag from 23% in the raw ferromanganese slag to about 6% in the processed ferromanganese slag, by mass. The carbon, e.g. as coal, may be added from a suitable bin (not shown) to the arc furnaces which replace the induction furnaces 76.

A problem encountered in prior attempts to use metallurgical slag for the purposes proposed for the processed slag product of the method of the present invention, is that its heavy metal content renders it an environmental hazard, and unattractive for use as a filler in brick-making or in formulating ready-mix concrete, as an extender for extending a cement or as an aggregate for use in the construction- or building industry. This problem with heavy metal contamination exists even for relatively acceptable heavy metals such as iron, but is particularly offensive when heavy metals which are toxic, such as manganese, are involved. It is a feature of the present invention that, by providing, from a raw slag having a relatively high heavy metal content, a processed slag having a relatively low heavy metal content, the problems arising from using slag products containing heavy metals can be reduced, sometimes substantially, if not eliminated. The Applicant has found that the method of the invention can make cement extender products that comply with all the requirements of EN197 (European Norms No. 197). Furthermore, heavy metal or heavy metal alloy products such as manganese or ferromanganese can be produced by the method of the invention.

The invention claimed is:

1. A method of processing a starting material in the form of waste raw metallurgical slag having a toxic heavy metal content which is undesirable, and to dispose of the raw slag containing the undesirable toxic heavy metal content while producing at least one product, the method being characterised in that it includes the steps of:
    admixing a raw slag which comprises a mixture of at least one manganese-containing slag and at least one iron-containing slag with a reductant to obtain a reaction mixture;
    heating the reaction mixture to cause the reductant to reduce heavy metal compounds in the raw slag to obtain molten ferromanganese and molten processed slag;
    separating the molten ferromanganese from the molten processed slag; and
    causing or allowing the processed slag to solidify.

2. A method as claimed in claim 1, characterized in that the toxic heavy metal compounds include compounds selected from the group consisting of heavy metal oxides, heavy metal silicates, and mixtures thereof.

3. A method as claimed in claim 1, characterized in that both the raw slag and the reductant which are admixed to obtain the reaction mixture are in solid form when they are admixed.

4. A method as claimed in claim 1, characterized in that at least part of the raw slag which is admixed with the reductant to obtain the reaction mixture is in molten form, the reductant being in solid form.

5. A method as claimed in claim 1, characterized in that it includes the step of comminuting at least one of the raw slag and the reductant in solid form to achieve size reduction thereof before the admixing.

6. A method as claimed in claim 1, characterized in that the raw slag is comminuted to achieve size reduction thereof, the comminuted raw slag then, before the admixing, being subjected to size classification to obtain a desired particle size fraction thereof which is admixed with the reductant to obtain the reaction mixture.

7. A method as claimed in claim 1, characterized in that the heating of the reaction mixture is by means of a furnace, the method including the step of discharging the molten metal and the molten slag from the furnace at a temperature in the range 1300-1650° C.

8. A method as claimed in claim 7, characterized in that the discharging of the molten metal and the molten slag from the furnace is at a temperature in the range 1350-1550° C.

9. A method as claimed in claim 7, characterized in that the furnace is an arc furnace which is operated batchwise.

10. A method as claimed in claim 1, characterized in that it includes the step of allowing the molten processed slag to solidify by subjecting it to air-cooling by natural convection, the solidified processed slag then being subjected to comminution to achieve size reduction thereof which renders it in the form of an aggregate, the aggregate being a said product.

11. A method as claimed in claim 1, characterized in that it includes the step of causing the molten processed slag to solidify by contacting it with liquid water to cause granulation of the processed slag to obtain a granulated processed slag product, the granulated processed slag being a said product.

12. A method as claimed in claim 11, characterized in that the granulation of the processed slag achieves vitrification of the slag, the granulation being such as to obtain a grain- or particle size of at most 10mm and to obtain a glass content of the granulated slag of at least 50% by mass.

13. A method as claimed in claim 11, characterized in that it includes the step of de-watering the granulated processed slag.

14. A method as claimed in claim 11, characterized in that it includes the step of comminuting the granulated processed slag to achieve size reduction thereof.

15. A method as claimed in claim 1, characterized in that the molten ferromanganese separated from the molten slag is a said product.

16. A method as claimed in claim 15, characterized in that the separated ferromanganese is fed to a metallurgical furnace for further processing.

17. A method as claimed in claim 16, characterized in that the ferromanganese separated from the processed slag is caused or allowed to solidify, before it is fed to the metallurgical furnace for further processing.

18. A method as claimed in claim 1, characterized in that it includes the step, while admixing the raw slag with the reductant to obtain the reaction mixture, of also admixing a silicon-containing reagent therewith.

19. A method as claimed in claim 18, characterized in that it includes the step, while admixing the raw slag with the reductant to obtain the reaction mixture, of also admixing a calcium-containing reagent therewith.

20. A method as claimed in claim 1, characterized in that the composition of the reaction mixture is selected to provide the ferromanganese product with a manganese content of 70-90% by mass and an iron content of 5-20% by mass.

21. A method as claimed in claim 20, characterized in that the manganese content is 76-80% by mass, the iron content being 10-15% by mass.

22. A method as claimed in claim 1, characterized in that the iron-containing slag is a slag obtained from a basic oxygen furnace (BOF) steel production process.

23. A method as claimed in claim 22, characterized in that the iron-containing slag comprises 20-45% by mass of iron, expressed as $Fe_2O_3$.

24. A method as claimed in claim 1, characterized in that the manganese-containing slag is a slag obtained from a ferromanganese production process.

25. A method as claimed in claim 1, characterized in that the manganese-containing slag comprises 15-65% by mass manganese, expressed as MnO.

26. A method as claimed in claim 1, characterized in that the reaction mixture contains calcium, magnesium and silicon, the calcium, magnesium and silicon being present in proportions which, when expressed respectively as CaO, MgO and $SiO_2$, provide the reaction mixture with a basicity expressed as the mass ratio of (CaO+MgO) to $SiO_2$, in the range 1.3:1-1.8:1.

27. A method as claimed in claim 26, characterized in that the basicity is in the range 1.4:1-1.7:1.

28. A method as claimed in claim 1, characterized in that sufficient reductant is employed in the reaction mixture to achieve a manganese content in the processed slag of at most 10% by mass, expressed as MnO.

29. A method as claimed in claim 28, characterized in that the manganese content achieved in the processed slag is at most 7% by mass, expressed as MnO.

* * * * *